United States Patent [19]

Atwell et al.

[11] Patent Number: 4,888,376

[45] Date of Patent: Dec. 19, 1989

[54] CURABLE ORGANOPOLYSILOXANES FILLED WITH SILICON CARBIDE POWDERS AND HIGHLY DENSIFIED SINTERED BODIES THEREFROM

[75] Inventors: William H. Atwell; Gary T. Burns; Chandan K. Saha, all of Midland, Mich.

[73] Assignee: Dow Corning Corporation, Midland, Mich.

[21] Appl. No.: 248,884

[22] Filed: Sep. 26, 1988

[51] Int. Cl.[4] .................................................. C08K 3/00
[52] U.S. Cl. .............................. 524/401; 264/331.11; 501/88; 501/96; 501/97; 501/99; 524/404; 524/424; 524/430; 524/431; 524/428; 524/440; 524/441; 524/439
[58] Field of Search ...................... 501/88, 96, 97, 99; 264/331.11; 524/424, 401, 440, 441, 430, 431, 439, 428, 404

[56] References Cited

U.S. PATENT DOCUMENTS

| | | |
|---|---|---|
| 3,090,691 | 5/1963 | Weyer . |
| 3,108,985 | 10/1963 | Weyer . |
| 3,485,904 | 12/1969 | Ostrowski . |
| 4,004,934 | 1/1977 | Prockazaka et al. . |
| 4,041,117 | 8/1977 | Prockazka et al. . |
| 4,081,284 | 3/1978 | Prockazka et al. . |
| 4,122,139 | 10/1978 | Yajima et al. . |
| 4,255,316 | 3/1981 | Blizzard . |
| 4,269,753 | 5/1981 | Mine et al. . |
| 4,269,757 | 5/1981 | Mine et al. . |
| 4,289,720 | 9/1981 | Yajima et al. . |

FOREIGN PATENT DOCUMENTS

| | | |
|---|---|---|
| 1180189 | 1/1985 | Canada . |
| 3500962 | 7/1985 | Fed. Rep. of Germany . |
| 54-134744 | 10/1979 | Japan . |
| 60-16869 | 1/1985 | Japan . |

OTHER PUBLICATIONS

Yajima, et al.; "Pyrolysis of a Polyborodiphenylsiloxane", 266 Nature 521, (1977).

Yajima, et al.; "SiC and $Si_3N_4$ Sintered Bodies with New Borodiphenylsiloxane Polymers as Binder," 266 Nature 522, (1977).

Primary Examiner—Melvyn I. Marquis
Attorney, Agent, or Firm—James E. Bittell

[57] ABSTRACT

The preparation of highly densified ceramic bodies by sintering certain curable organopolysiloxanes filled with silicon carbide powders, metal-containing sintering aids, and organopolysiloxane curing agents described. Such highly densified ceramic bodies can be prepared by either a pressure-less or a hot press sintering process. The compositions of this invention can be formed into desired shapes and then sintered to form ceramic, shaped bodies with high densities. One advantage of the present invention is that the green bodies have relative high strengths and thus can be easily handled and, if desired, machined before sintering. The curable organopolysiloxanes useful in this invention must yield a ceramic char which contains free or excess carbon in addition to carbon in the form of silicon carbide upon pyrolysis to elevated temperatures.

50 Claims, No Drawings

CURABLE ORGANOPOLYSILOXANES FILLED WITH SILICON CARBIDE POWDERS AND HIGHLY DENSIFIED SINTERED BODIES THEREFROM

BACKGROUND OF THE INVENTION

This invention relates to the preparation of highly densified ceramic bodies by the pyrolysis of certain curable organopolysiloxanes filled with silicon carbide powders, organopolysiloxane curing agents, and certain metal-containing sintering aids. Such highly densified ceramic bodies can be prepared by either a pressureless sintering process or a hot press sintering process. This invention also relates to novel compositions of matter consisting essentially of silicon carbide powder, a metal-containing sintering aid, an organopolysiloxane curing agent, and a preceramic organopolysiloxane. These compositions of matter can be formed into desired shapes and then sintered to form ceramic, shaped bodies with high densities. One advantage of the present invention is that the green bodies have relative high strengths and thus can be easily handled and, if desired, machined before sintering. The green strength of the shaped bodies can be further increased by curing the formed body prior to sintering.

Prockazka in U.S. Pat. Nos. 4,004,934 and 4,041,117 and Prockazka et al. in U.S. Pat. No. 4,081,284 describe high density silicon carbide ceramic bodies prepared in a pressureless sintering process. Such ceramic bodies were prepared from mixtures consisting of silicon carbide powder, a boron-containing additive, and a carbonaceous additive. The carbonaceous additives or binders were high molecular weight, carbon-based aromatic compounds such as phenol-formaldehyde condensate-novolak, resorcinol-formaldehyde, aniline-formaldehyde, cresol-formaldehyde, derivatives of polynuclear aromatic hydrocarbon compounds contained in coal tar, polyphenylene, polymethylphenylene, and the like. Ceramic silicon carbide materials with greater than 85% of theoretical density were obtained.

Onda et al. in Japanese Kokai Pat. No. 60-16869 describe a method of preparing high density silicon carbide ceramics which involves pressureless sintering a mixture consisting of silicon carbide powder, an auxiliary sintering aid, and an organosilicon polymer characterized by a Si-C skeletal structure. Disclosed sintering aids include boron-, aluminum-, and beryllium-containing compounds. The organosilicon polymers were described as "high-molecular-weight organic silicon-containing compounds with silicon-carbon skeletal structures." The organosilicon polymers were not further identified even in the examples. Based on this limited description, however, it appears likely that the organosilicon polymers were polycarbosilanes which have a Si-C skeletal backbone.

The present invention provides high density ceramic products from a pressureless sintering process using curable organopolysiloxanes as binders. Generally, high density ceramic materials will possess high strengths.

THE INVENTION

This invention relates to a method of preparing a sintered body of silicon carbide, said method comprising (a) forming a handleable green body by (i) preparing an intimate mixture consisting essentially of silicon carbide powder, a metal-containing sintering aid, an organopolysiloxane curing agent, and a preceramic organopolysiloxane, where the metal-containing sintering aid is present at 0.1 to 3.0 weight percent of the metal based on the weight of silicon carbide powder, where the organopolysiloxane curing agent is present in an effective amount, and where the preceramic organopolysiloxane is present at such a level that the free carbon value of the mixture is greater than 0.2 weight percent based on the total weight of the silicon carbide powder and the char derived from the preceramic organopolysiloxane, and (ii) then forming the intimate mixture into the desired shape under pressure at a temperature less than about 500° C. to obtain a handleable green body; and (b) sintering the handleable green body in an inert atmosphere at a temperature greater than 1900° C. to obtain a sintered body of silicon carbide with a density greater than 2.4 g/cm$^3$.

This invention further relates to a method of forming a handleable green body, which method comprises (a) preparing an intimate mixture consisting essentially of silicon carbide powder, a metal-containing sintering aid, an organopolysiloxane curing agent, and a preceramic organopolysiloxane, where the metal-containing sintering aid is present at 0.1 to 3.0 weight percent of the metal based on the weight of silicon carbide powder, where the organopolysiloxane curing agent is present in an effective amount, and where the preceramic organopolysiloxane is present at such a level that the free carbon value of the mixture is greater than 0.2 weight percent based on the total weight of the silicon carbide powder and the char derived from the preceramic organopolysiloxane; and (b) forming the intimate mixture into the desired shape under pressure at a temperature less than about 500° C.

This invention additionally relates to a uniform mixture consisting essentially of silicon carbide powder, a metal-containing sintering aid, a preceramic organopolysiloxane, and an organopolysiloxane curing agent, where the metal-containing sintering aid is present at 0.1 to 3.0 weight percent of the metal based on the weight of silicon carbide powder, where the organopolysiloxane curing agent is present in an effective amount, and where the preceramic organopolysiloxane is present at such a level that the free carbon value of the mixture is greater than 0.2 weight percent based on the total weight of the silicon carbide powder and the char derived from the preceramic organopolysiloxane.

This application is closely related to a copending application, which is hereby incorporated by reference, entitled "Highly Densified Sintered Bodies From Organopolysiloxanes Filled with Silicon Carbide Powders" by the same inventors and filed on the same date as the present application. This copending application describes organopolysiloxanes filled with silicon carbide without the use of curing agents. Generally, the green bodies prepared by the method of this copending application are not as strong as those prepared by the method of the present application.

The sintered bodies produced from the practice of this invention have densities greater than about 75% of theoretical (i.e., densities greater than about 2.4 g/cm$^3$). Such highly densified bodies are useful as light weight refractory ceramics. The theoretical density of silicon carbide is 3.21 g/cm$^3$.

The novel compositions of the present invention consists essentially of an organopolysiloxane filled with silicon carbide powder, a metal-containing sintering aid, and an organopolysiloxane curing agent. These novel compositions can be used to prepare handleable green bodies. By "handleable green bodies" we mean green bodies which have sufficient green strength to be handled or machined prior to sintering. Additionally, the compositions may be cured prior to sintering to obtain even stronger green bodies. High green strength is one significant advantage of the present invention; the high green strength allows the green bodies to be further processed and shaped prior to the final sintering or pyrolysis step. Generally, green strengths of 500 psi or more may be obtained in the practice of this invention.

The green bodies may be formed by conventional techniques known in the art. Such methods include pressure molding, uniaxial pressing, isopressing, extrusion, transfer molding, injection molding, and the like. The formed green bodies may be further shaped by machining if desired. Once shaped, the green bodies are fired to an elevated temperature under an inert atmosphere to convert the green bodies into ceramic articles having densities greater than about 75% of theoretical. It is preferred that the density of the formed ceramic article be greater than about 85% of theoretical (about 2.7 g/cm$^3$). It is more preferred that the density of the produced ceramic article be greater than about 2.9 g/cm$^3$ (90% of theoretical); it is most preferred that the density be greater than about 3.05 g/cm$^3$ (95% of theoretical). The sintering may be carried out using either a pressureless sintering process or a hot press sintering process. Either process will produce a highly densified ceramic article using the compositions of this invention. The hot press sintering process will generally produce higher density ceramic articles. Therefore, if the maximum density is desired, a hot press sintering process would be preferred. Generally, however, the pressureless sintering process is preferred because of the simplified operations involved. The sintering step is carried out under an inert atmosphere such as nitrogen or argon. The growth of alpha-SiC grains can be reduced by sintering under a nitrogen-containing atmosphere.

The sintering to the final ceramic product is generally carried out at a temperature of about 1900° C. or higher. Lower temperatures can be used but the ceramic product may not possess the desired density. The preferred sintering temperature is about 2000° to 2200° C. with about 2150° C. being most preferred.

The organopolysiloxanes useful in this invention are generally well known in the art. The organopolysiloxanes must be capable of being converted to ceramic materials with a significant ceramic char yield. Generally, the ceramic char yield should be greater than about 20 weight percent. Naturally, there will be less shrinkage if the ceramic char yield is higher. Therefore, it is preferred that organopolysiloxanes with ceramic char yields greater than about 40 weight percent be employed in the practice of this invention. The organopolysiloxane must also yield a ceramic char containing free carbon. Using a rule of mixtures, the ceramic char must contain greater than about 30 weight percent total carbon in order for free carbon to be present. Organopolysiloxanes which yield ceramic chars with greater than about 40 weight percent total carbon are preferred. A 40 weight percent carbon-containing ceramic material contains, based on a rule of mixtures, about 86 weight percent SiC and 14 weight percent free carbon. Most preferred are organopolysiloxanes which yield ceramic chars with greater than about 50 weight percent total carbon; a 50 weight percent carbon-containing ceramic material contains, based on a rule of mixtures, about 72 weight percent SiC and 28 weight percent free carbon. It is generally preferred that the ceramic char contain at least 10 weight percent free carbon. It is more preferred that the ceramic char contain at least 25 weight percent free carbon.

So long as the organopolysiloxane can be converted to a ceramic char with sufficient char yield and the derived ceramic char contains sufficient free carbon, the structure of the organopolysiloxane is not critical. The organopolysiloxane may contain units of general structure $[R_3SiO_{0.5}]$, $[R_2SiO]$, $[RSiO_{1.5}]$, and $[SiO_2]$ where each R is independently selected from the group consisting of hydrogen, alkyl radicals containing 1 to 20 carbon atoms, phenyl radicals, and vinyl radicals. Generally, organopolysiloxanes which contain phenyl groups are preferred as such groups easily allow for the formation of ceramic chars with sufficient free carbon. Organopolysiloxanes which contain vinyl groups are also preferred since vinyl groups attached to silicon provide a mechanism whereby the organopolysiloxane can be cured prior to sintering. Preferred organopolysiloxanes contain varying amounts of $[PhSiO_{1.5}]$, $[MeSiO_{1.5}]$, and $[PhViSiO]$ units. Especially preferred organopolysiloxanes are described by the unit formula $$[PhSiO_{1.5}][MeSiO_{1.5}][PhViSiO]$$

where there are 10 to 90 mole percent $[PhSiO_{1.5}]$ units, 0 to 50 mole percent $[MeSiO_{1.5}]$ units, and 10 to 90 mole percent $[PhViSiO]$ units; more preferably, there are 20 to 30 mole percent $[PhSiO_{1.5}]$ units, 30 to 50 mole percent $[MeSiO_{1.5}]$ units, and 30 to 50 mole percent $[PhViSiO]$ units. Organopolysiloxanes useful in this invention may contain other siloxane units in addition to, or in place of, the siloxane units just mentioned. Examples of such siloxane units include $[ViSiO_{1.5}]$, $[PhMeSiO]$, $[MeHSiO]$, $[MeViSiO]$, $[Ph_2SiO]$, $[Me_2SiO]$, $[Me_3SiO_{0.5}]$, and the like. Mixtures of organopolysiloxanes may also be employed. Generally, organopolysiloxanes where R is almost exclusively methyl are not suitable for use in this invention as there is insufficient free carbon in the resulting ceramic char.

The organopolysiloxanes of this invention can be prepared by techniques well known in the art. The actual method used to prepare the organopolysiloxanes is not critical. Most commonly, the organopolysiloxanes are prepared by the hydrolysis of organochlorosilanes. Such methods, as well as others, are described in Noll, *Chemistry and Technology of Silicones*, chapter 5 (translated 2d Ger. Ed., Academic Press, 1968). Specific methods for preparation of suitable organopolysiloxanes are illustrated in the examples included in the present specification.

In addition to the organopolysiloxane, other components in the compositions of this invention include silicon carbide powder, a metal-containing sintering aid, and an organopolysiloxane curing agent. The silicon carbide powders useful in this invention are commercially available. Both alpha-SiC and beta-SiC powders, as well as mixtures, can be used. Generally, SiC powders with an average particle size of less than five microns are preferred; powders with an average particle size of less than one micron are more preferred.

Suitable metal-containing sintering aids include iron, Fe$_3$C, magnesium, MgC$_3$, lithium, Li$_2$C$_2$, beryllium, Be$_2$C, boron, boron-containing compounds, aluminum, aluminum-containing compounds, and metal oxides such as thorium oxide, yttrium oxide, lanthanum oxide, and cerium oxide. Many of these metal-containing sintering aids are described in Negita, "Effective Sintering Aids for Silicon Carbide Ceramics: Reactivities of Silicon Carbide with Various Additives," 69 J. Am. Ceram. Soc. C-308 (1986). Other metal-containing sintering aids suggested by Negita might also be effective in the practice of this invention. Generally, the sintering aid should be present at an amount equivalent to about 0.1 to 3.0 weight percent of the metal based on the weight of the silicon carbide powder. Preferred sintering aids are selected from the group consisting of boron, boron-containing compounds, aluminum, and aluminum-containing compounds. Examples of boron-containing sintering aids include boron carbide, lithium borohydride, trivinylboron, triphenylboron, silicon hexaboride, $H_3BO_3$, $B_2O_3$, and the like. Examples of aluminum-containing sintering aids include aluminum oxide, aluminum nitride, aluminum diboride, and the like. The most preferred sintering aids are boron and boron carbide. Mixtures of sintering aids may also be used.

The compositions of this invention also contain organopolysiloxane curing agents. Such curing agents can be used to cure (via crosslinking the organopolysiloxanes) the shaped articles prior to sintering. Such cured articles generally have higher strengths than the non-cured articles and, thus, can better withstand any handling or machining processes prior to sintering. Conventional organopolysiloxane curing agents which are useful in the present invention are well known in the art. Examples include organic peroxides such as dibenzoyl peroxide, bis-p-chlorobenzol peroxide, bis-2,4-dichlorobenzol peroxide, di-t-butyl peroxide, dicumyl peroxide, t-butyl perbenzoate, and t-butyl peracetate; and platinum-containing curing agents such as platinum, $H_2PtCl_6$, and $((C_4H_9)_3P)_2PtCl_2$. Preferred organopolysiloxane curing agents include dicumyl peroxide and t-butyl perbenzoate. Other conventional organopolysiloxane curing agents known in the art may also be used. The organopolysiloxane curing agent is present in an effective amount, i.e. an amount sufficient to induce crosslinking in the organopolysiloxane. Therefore, the actual amount of the curing agent will depend on the activity of the actual agent used. Normally, however, the non-platinum curing agent will be present at about 0.1 to 5.0 weight percent based on the weight of the organopolysiloxane with the preferred level being about 2.0 weight percent. When the organopolysiloxane contains both vinyl groups and hydrogen atoms attached to silicon, platinum-containing curing agents can be used. For such platinum-containing curing agents, the level of curing agents will normally be such that platinum is present at about 1 to 1000 ppm based on the weight of the organopolysiloxane with the preferred level at about 50 to 150 ppm platinum.

The preceramic organopolysiloxane is present in the compositions of the present invention at such a level that the free carbon value of the composition is greater than 0.2 weight percent based on the total weight of the silicon carbide powder and the char derived from the preceramic organopolysiloxane.

What is meant by "free carbon value of the mixture" in this invention is the amount of free or excess carbon derived from the organopolysiloxane during pyrolysis as expressed by a weight percentage based on the total weight of the silicon carbide powder and the char derived from the organopolysiloxane. The total amount of carbon in the ceramic char equals the amount of free or excess carbon plus the amount of carbon in the form of silicon carbide. The amount of free carbon derived from the organopolysiloxane is determined by pyrolysis of the organopolysiloxane, in the absence of any silicon carbide powder or sintering aid, to an elevated temperature under an inert atmosphere until a stable ceramic char is obtained. For purposes of this invention, a "stable ceramic char" is defined as the ceramic char produced at an elevated temperature which will not significantly decrease in weight upon further exposure at the elevated temperature. Normally, a stable ceramic char is produced upon pyrolysis at 1800° C. for about 30 minutes. Other elevated temperatures can be used to form the stable ceramic char but the length of exposure to the elevated temperature will need to be increased for temperatures less than 1800° C. Both the ceramic yield and the carbon content of the stable ceramic char are then determined. Using a rule of mixtures, the amount of SiC and free carbon of the stable ceramic char can be calculated. The amount of free carbon normally is expressed as weight of free carbon produced per gram of preceramic organopolysiloxane. Knowing the amount of free carbon produced by pyrolysis of the organopolysiloxane, one can determine how much organopolysiloxane is required to obtain an organopolysiloxane/silicon carbide mixture with the desired free carbon value. Naturally, if one is using the same or very similar organopolysiloxane to prepare a sintered body, it is not required that the amount of free carbon produced per gram of organopolysiloxane be determined every time.

This procedure can perhaps be best illustrated by example. Assume an organopolysiloxane (100 g) which gives, upon pyrolysis to 1800° C., a char yield of 50 weight percent which contains 40 weight percent carbon and 60 weight percent silicon. Such a char contains 30 g (1.07 moles) silicon. Using a rule of mixtures, the char also contains 1.07 moles (12.8 g) of carbon in the form of SiC. Since the char contains 20 g carbon, the amount of free carbon in the char is 7.2 g (20 g minus 12.8 g). Thus each gram of the preceramic organopolysiloxane yields 0.072 g free carbon. If a free carbon value for the mixture of 1.5 weight percent is desired, the following calculations can be preformed. Let X equal the amount of organopolysiloxane required. The amount of char derived from the organopolysiloxane is 0.5X (in grams, based on a 50% char yield); the amount of free carbon formed during the pyrolysis is 0.072X (in grams). For a mixture containing 100 g of SiC powder, the equation $$0.015 = (0.072X)/(100 + 0.5X)$$

is obtained where 0.072X is the amount of free carbon derived from the organopolysiloxane and (100+0.5X) is the total weight of SiC powder and char derived from the organopolysiloxane. Solving the above equation for X, it is found that 23.3 g of the organopolysiloxane will give the desired 1.5% free carbon value of the mixture. Using this procedure, the amount of organopolysiloxane required to prepare the compositions of this invention can be determined. This procedure avoids the costly and time consuming trial and error method which might otherwise be required.

The free carbon value of the mixture must be greater than 0.2 weight percent based on the total weight of the silicon carbide powder and the char derived from the organopolysiloxane. For free carbon values less than about 0.2 weight percent the density of the sintered body will generally fall below about 2.4 g/cm³ (75% of theoretical). It is generally preferred that the free carbon value of the mixture is greater than 0.5% and that the density of the resulting sintered body be greater than about 85% of theoretical. It is more preferred that the free carbon value of the mixture be between 0.5 and 3.0 weight percent with a range of 1.0 to 2.0 weight percent being even more preferred. The optimum density is generally obtained when the free carbon value of the mixture is about 1.5 weight percent.

Once the amount of organopolysiloxane required in the mixture has been determined, the various components are combined in a manner that assures a uniform and intimate mixture. Such a mixture is required to avoid areas of varying density throughout the sintered product. Uniform and intimate mixtures can be prepared by using conventional blending techniques. Examples of such techniques include grinding the various powders in either the dry or wet state. Generally preferred is wet grinding where the various powders are mixed and ground with organic solvents, the solvent removed, and then the resulting mixture is further ground. Other mixing and grinding methods will be apparent to those skilled in the art. The uniform and intimate mixture may then be formed into the desired shape. Preferably, the desired shape is formed under pressure using such methods as injection molding, uniaxial pressing, isopressing, extrusion, transfer molding, and the like. Once formed the article may be further shaped by machining. The composition is preferably cured prior to its final shaping. Curing procedures are well known in the art. Generally, such curing can be carried out by heating the article to about 50° to 300° C. Once the final shape has been obtained, the article is sintered in an inert atmosphere to a temperature of 1900° C. or more. The preferred sintering temperature is about 2000° to 2200° C. with about 2150° C. being most preferred.

Although not wishing to be limited by theory, it is thought that the free carbon derived from the preceramic organopolysiloxane plays two different roles in the formation of highly densified sintered bodies. First, it helps remove oxygen present in the silicon carbide powder; and secondly, it apparently acts as an additional sintering aid. Silicon carbide powders often contain so called "free carbon." However, the "free carbon" present in the silicon carbide powder does not appear to be as active or effective as free carbon generated in situ from the preceramic organopolysiloxane. It is not clear whether the free carbon produced in situ is more active chemically or whether it is simply more evenly dispersed. In any event, when the free carbon value of the mixture (as defined earlier) is about 1.5 weight percent, sintered bodies with optimum densities are obtained.

So that those skilled in the art can better appreciate and understand the invention, the following examples are given. Unless otherwise indicated, all percentages are by weight. Throughout this specification "Me" represents a methyl group, "Ph" represents a phenyl group, and "Vi" represents a vinyl group.

In the following examples, the analytical methods used were as follows:

Proton NMR spectra were recorded on either a Varian EM360 or EM390 spectrometer; fourier transform IR spectra were recorded on a Nicolet 5 DX spectrometer. Gel permeation chromatography (GPC) data were obtained on a Waters GPC equipped with a model 600E systems controller, a model 490 UV and model 410 Differential Defractometer detectors; all values are relative to polystyrene.

Carbon analysis was done on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry.

Compounding was done on a Brabender Plasticorder (Model PL-V151) equipped with roller blades. A 12 ton Hull console molding machine (model 359E) was used for transfer molding. Test bars were formed on a Carver laboratory press (Fred S. Carver Inc., Summit, N.J.) using a tungsten carbide lined die. Pyrolysis was carried out in an Astro graphite element tube furnace Model 1000-3060-FP12 equipped with an Eurotherm Controller/Programmer Model 822. Flex strengths (using the four-point bend technique) were determined on either a Model TTC or Model 8562 Instron instrument.

Four different SiC powders were employed: Ibiden UF SiC ("Ibiden"), which contains a mixture of about 5 to 8% alpha-SiC and 92 to 95% beta-SiC; Superior Graphite (HSC 059) beta-SiC ("Superior Graphite"); Herman C. Starck Co. A10 alpha-SiC ("Starck A10"); and Herman C. Starck Co. B10 SiC ("Starck B10"), which contains a mixture of about 15% alpha-SiC and 85% beta-SiC. The boron used was amorphous boron powder from Cerac Inc. The boron carbide (Tetrabor) was from Elektroschmelzwerk Kempten Gnbh., Munich, West Germany. The aluminum oxide (Baikalox CR 125) was obtained from Baikowski International Corp., Charlotte, North Carolina. And the aluminum nitride (Grade A) was from Herman C. Starck Co.

EXAMPLE 1

Preparation of Sintered Bodies with $(PhMeSiO)_{0.72}(MeViSiO)_{0.14}(MeHSiO)_{0.14}$.

A—Polymer Synthesis. A solution of 47.78 g (0.25 moles) $PhMeSiCl_2$, 7.06 g (0.05 moles) $MeViSiCl_2$, and 5.75 g (0.05 moles) $MeHSiCl_2$ in about 120 mL toluene was added dropwise to a stirred mixture of 74.2 g $Na_2CO_3$ in 300 mL water. After stirring for about one hour, the organic layer was collected, dried over $MgSO_4$, and filtered. Concentration of the filtrate gave 31.9 g (77.2% yield) of a cloudy, viscous oil. IR (KBr, thin film): 3073 (w), 3052 (w), 2959 (w), 2903 (w), 2164 (w), 1595 (w), 1427 (w), 1406 (w), 1265 (s), 1124 (s), 1082 (s), 1026 (s), 907 (m), 872 (w), 973 (s), 731 (m), and 694 cm$^{-1}$ (m).

B—Char Composition Calculations. A sample of the above polymer under argon was heated to 1800° C. at 10° C./min and held at 1800° C. for two hours before cooling to room temperature. The sample had a mass retention of 39.6% and contained 49.0% carbon and 46.7% silicon. The following calculations were made: 100 g of cured polymer gives 39.6 g of a ceramic char consisting of 49.0% carbon and 51.0% silicon (by difference). (In order to simplify the calculations, the amount of oxygen has been ignored.) The char consists of 28.9 g SiC (73%) and 10.7 g carbon (27%). Therefore, each gram of polymer, after pyrolysis, gives 0.289 g SiC and 0.107 g free carbon.

C—Test Bar Fabrication. A series of five siloxane/SiC powder blends were prepared using the following procedure: A weighed sample of the siloxane prepared above and about two weight percent benzoyl peroxide (based on weight of the siloxane) were dissolved in 10 to 20 mL toluene. This solution was mixed with Ibiden SiC powder and boron in a hardened alumina mortar and pestle until a thick paste was formed. The residual solvent was removed under vacuum. The dried powder was reground in a mortar and pestle and then passed through a 90 μm mesh sieve. The sieved powder was dry pressed into 35×8×2 mm test bars at approximately 9.4 ksi. Each test bar was prepared with 20.000 g of SiC and 0.080 g boron and varying amounts of organopolysiloxane and benzoyl peroxide. The test bars were fired to 2150° C. in an Astro tube furnace (argon atmosphere) using the following temperature program: room temperature to 300° C. at 26.7° C./min, 300° to 700° C. at 25° C./min, 700° to 1350° C. at 20° C./min, 1350° C. for 30 minutes, 1350° C. to 2150° C. at 20° C./min, and 2150° C. for 30 minutes. The density of the fired test bars was measured. The following results were obtained:

| Test Bar | Wt. (g) Poly- mer | Wt. (g) Bz202 | Green Density (g/cm$^3$) | Fired Density (g/cm$^3$) | Free Carbon Value (%) | Flex Strength* (ksi) |
|---|---|---|---|---|---|---|
| 1 | 1.000 | 0.021 | 1.97 | 2.54 | 0.5 | 19.3 |
| 2 | 2.000 | 0.040 | 2.06 | 2.84 | 1.0 | 31.7 |
| 3 | 3.000 | 0.060 | 2.16 | 3.10 | 1.5 | 51.2 |
| 4 | 4.000 | 0.080 | 2.23 | 3.11 | 2.0 | — |
| 5 | 6.000 | 0.124 | — | 3.08 | 2.9 | — |

*For sintered test bars (machined according to MIL-STD-1942 (Nov. 21, 1983)).

EXAMPLE 2

Preparation of Sintered Bodies with $(PhSiO_{1.5})_{0.30}(PhViSiO)_{0.70}$.

A—Polymer Synthesis. A solution of 71.8 g (0.35 moles) PhViSiCl$_2$ and 31.7 g (0.15 moles) PhSiCl$_3$ in 70 mL toluene was added dropwise to a stirring mixture of 70 g of Na$_2$CO$_3$ in 450 mL water and 200 mL toluene. After the addition was complete, the reaction mixture was stirred at room temperature for 30 minutes. The two phases were separated, the organic layer collected, and then concentrated under vacuum. The residue (71 g) was dissolved in 400 mL toluene and the solution refluxed over 0.5 g KOH. The water was collected in a Dean-Stark trap. The toluene solution was further dried over MgSO$_4$ and filtered through a sintered glass frit. Concentration of the filtrate under vacuum gave 59.6 g (83.8% yield) of a viscous oil. GPC molecular weight (THF solvent): M$_n$=901, M$_w$=3711. Proton NMR (CDCl$_3$, delta-values): 5.33 to 6.17 (SiVi, broad multiplet) 6.67 to 7.70 (SiPh, broad multiplet); the SiPh/SiVi molar ratio was 1.5/1.0.

B—Calculations. A mixture of 1.672 g of the above polymer and 0.056 g benzoyl peroxide was dissolved in about 5 mL toluene, the toluene removed under vacuum, and the residue heated to greater than about 150° C. for about 10 minutes in an argon atmosphere. The residue was weighed into a graphite crucible and transferred into an Astro tube furnace. The furnace was twice evacuated to less than 20 torr and then backfilled with argon. Under an argon purge, the sample was heated to 1800° C. at 10° C./min and held at 1800° C. for two hours before cooling to room temperature. The sample had a mass retention of 42.8% and contained 62.2% carbon, 36.8% silicon, and 0.2% oxygen. The following calculations were made: 100 g of cured polymer gives 42.8 g of a ceramic char consisting of 62.2% carbon and 37.8% silicon (by difference). The char consists of 23.1 g SiC (54%) and 19.7 g carbon (46%). Therefore, each gram of polymer, after pyrolysis, gives 0.231 g SiC and 0.197 g free carbon.

C—Test Bar Fabrication. A series of seven siloxane/SiC blends were prepared using the same procedure as in Example 1. Each test bar was prepared with 25.00 g of Ibiden SiC, 0.10 g boron, and varying amounts of organopolysiloxane and benzoyl peroxide. The test bars were fired to 2150° C. under an argon atmosphere using the same temperature profile as in Example 1. The following results were obtained:

| Test Bar | Wt. (g) Poly- mer | Wt. (g) Bz202 | Green Density (g/cm$^3$) | Fired Density (g/cm$^3$) | Free Carbon Value (%) | Flex Strength (ksi) |
|---|---|---|---|---|---|---|
| 1 | 0.250 | 0.006 | 1.87 | 2.41 | 0.2 | 16.8 |
| 2 | 0.624 | 0.014 | 1.89 | 2.65 | 0.5 | 20.2 |
| 3 | 1.000 | 0.024 | 1.95 | 2.97 | 0.8 | 44.7 |
| 4 | 1.500 | 0.030 | 1.97 | 3.11 | 1.2 | 53.7 |
| 5 | 2.000 | 0.042 | 1.99 | 3.16 | 1.5 | 56.7 |
| 6 | 2.500 | 0.050 | 2.03 | 3.09 | 1.9 | 61.7 |
| 7 | 5.000 | 0.104 | 2.25 | 3.09 | 3.6 | — |

*For sintered test bars (machined according to MIL-STD-1942 (Nov. 21, 1983)).

EXAMPLE 3

Effect of Firing Temperature on Density.

A siloxane/SiC blend with a free carbon value of 1.5% was prepared using the following procedure: 12.00 g of siloxane polymer of Example 2 and 0.252 g benzoyl peroxide (about 2 weight percent based upon the weight of siloxane polymer), dissolved in 150 mL toluene, was mixed with 150 g Ibiden SiC powder and 0.60 g boron. The free carbon value of the blend was 1.5%. The blend was attritor milled for 30 minutes. The resulting slurry was transferred to a resin kettle and the solvent removed under vacuum. The dried powder was ground in a mortar and pestle and then passed through a 90 μm mesh sieve. The sieved powder was dry pressed into test bars (35×8×2 mm) at 47 ksi. The test bars were fired to 1950°, 2000°, 2050°, and 2100° C. under an argon atmosphere using the same temperature program as in Example 1 except for the difference in the final temperature. The following results were obtained.

| Final Temperature (°C.) | Density (g/cm$^3$) | Percent of Theoretical |
|---|---|---|
| 1950 | 3.05 | 95.0 |
| 2000 | 3.08 | 96.0 |
| 2050 | 3.14 | 97.8 |
| 2100 | 3.15 | 98.1 |

EXAMPLE 4

Preparation of Sintered Bodies with $(PhSiO_{1.5})_{0.27}(MeSiO_{1.5})_{0.09}(PhViSiO)_{0.64}$.

A—Polymer Synthesis. A solution of 71.76 g (0.35 moles) PhViSiCl$_2$, 31.7 g (0.15 moles) PhSiCl$_3$, and 7.45 g (0.05 moles) MeSiCl$_3$ in 50 mL toluene was added dropwise to a stirring solution of 85 g Na$_2$CO$_3$ in 400 mL water and 200 mL toluene. After the addition was complete, the reaction mixture was stirred at room temperature for 30 minutes. The two phases were separated and the organic layer collected and concentrated under vacuum. The residue (64.9 g) was dissolved in 65 g toluene and the solution refluxed over 0.10 g KOH. The water was collected in a Dean-Stark trap. After all of the water was removed, the toluene solution was cooled to room temperature and about 0.3 mL Me$_3$SiCl was added. After about one hour, the solution was filtered through a medium glass frit. Concentration of the filtrate under vacuum gave 60.7 g (81.5% yield) of a viscous oil. Proton NMR (CDCl$_3$, delta-values): −0.3 to 0.4 (SiMe, broad hump), 5.5 to 6.2 (SiVi, broad multiplet), and 6.8 to 7.8 (SiPh, broad multiplet); the SiMe/SiVi/SiPh molar ratio was 1.0/7.1/10.8.

B—Char Composition Calculation. A sample of the above polymer was heated to 1800° C. using the same procedure as in Example 1, Part B. The sample had a mass retention of 48.1% and contained 62.2% carbon. The following calculations were carried out: 100 g of cured polymers gives 48.1 g of ceramic char consisting of 37.8% (by difference) silicon and 62.2% carbon. The char therefore consists of 26.0 g SiC (54.1%) and 22.1 g carbon (45.9%). Thus, each gram of polymer, after pyrolysis, gives 0.260 g SiC and 0.221 g free carbon.

C—Test Bar Fabrication. Five test bars were prepared from a blend containing 2.001 g of the siloxane polymer, 0.041 g benzoyl peroxide, and 25.0 g Ibiden SiC powder using the same procedures as in Example 1. The free carbon value of the blend was 1.7%. The average flex strength of the green test bars was 236 psi. The test bars were then fired to 2098° C. under argon using the same firing procedure as in Example 1. The average density of the fired test bars was 3.16 g/cm$^3$ (98.5% of theoretical); the average flex strength was 37.8±15.2 ksi.

EXAMPLE 5

Preparation of Sintered Bodies with (PhSiO$_{1.5}$)$_{0.21}$(MeSiO$_{1.5}$)$_{0.29}$(PhViSiO)$_{0.50}$.

A—Polymer Synthesis. A solution of 71.76 g (0.35 moles) PhViSiCl$_2$, 31.7 g (0.15 moles) PhSiCl$_3$, and 29.8 g (0.20 moles) MeSiCl$_3$ in 50 mL toluene was added dropwise to a stirring mixture of 180 g Na$_2$CO$_3$ in 400 mL water and 250 mL toluene. After the addition was complete, the reaction mixture was stirred at room temperature for 45 minutes. The two phases were separated and the organic layer collected and concentrated under vacuum. The residue (79.0 g) was dissolved in 88.7 g toluene and refluxed over 0.10 g KOH. After all of the water was removed using a Dean-Stark trap, the toluene solution was cooled to room temperature and about 1.0 mL Me$_3$SiCl was added. After about one hour, the solution was filtered through a medium glass frit. Concentration of the filtrate under vacuum gave 70.9 g (83.8% yield) of a tacky gum. The polymer was dissolved in 150 mL toluene and poured into about 1.5 liters isopropanol. The precipitated polymer was collected and dried at about 200° C. and 1 torr. Proton NMR (CDCl$_3$, delta-values): −0.36 to 0.40 (SiMe, broad singlet), 5.5 to 6.3 (SiVi, broad singlet), and 6.8 to 7.8 (SiPh, broad singlet); the SiMe/SiVi/SiPh molar ratio was 1.0/1.86/2.78.

B—Calculations. A sample of the above polymer (2.643 g) was mixed with 0.268 g of a (MeHSiO)$_{0.97}$(Me$_3$SiO$_{0.5}$)$_{0.03}$ fluid (about 20–40 centistoke viscosity) and 2 drops of 0.1M H$_2$PtCl$_6$ in isopropanol. The mixture was heated at 135° C. for approximately two hours before cooling to room temperature in order to crosslink the polymer. The residue was heated to 1800° C. at 10°/min and held at 1800° C. for two hours under an argon atmosphere before cooling to room temperature. The sample has a mass retention of 56.7% and contained 50.3% carbon. The following calculations were made: 100 g of cured polymer gives 56.7 g of a ceramic char consisting of 49.7% (by difference) silicon and 50.3% carbon. The char consists of 40.25 g SiC (71.0%) and 16.44 g carbon (29.0%). Therefore, each gram of polymer, after pyrolysis, gives 0.403 g SiC and 0.164 g free carbon.

C—Test Bar Fabrication. Using the above data, the following mixture was prepared with a 1.4% free carbon value and 0.3% boron: 2.082 g of the above siloxane polymer dissolved in about 10–15 mL toluene was mixed with 23.65 g Ibiden SiC powder, 0.073 g boron, 0.217 g of a (MeHSiO)$_{0.97}$(Me$_3$SiO$_{0.5}$)$_{0.03}$ fluid (about 20–40 centistoke viscosity), and 2–3 drops 0.1M H$_2$PtCl$_6$ in isopropanol was ground in an hardened alumina mortar and pestle until a thick paste was obtained. The paste was dried under vacuum to remove residual solvent. The dried powder was ground in a mortar and pestle and passed through a 90 μm mesh sieve. The sieved powder was dry pressed into test bars (35×8×2 mm) 46 ksi. The test bars were heated at 130° C. for one hour to crosslink the polymer. After curing, the test bars had an average flex strength of 1100±75 psi. The cured test bars were fired to 2100° C. at a rate of 10° C./min and held at 2100° C. for 30 minutes under an argon atmosphere. The average density of the six fired test bars was 3.14±0.01 g/cm$^3$ (97.8% of theoretical).

EXAMPLE 6

Hot Pressing of Siloxane/SiC Mixtures.

A sieved siloxane/SiC blend with a free carbon value of 1.5% was prepared by attritor milling a mixture of 150 g Ibiden SiC powder, 0.6 g boron, 12.0 g of a siloxane of the formula (PhSiO$_{1.5}$)$_{0.30}$(PhViSiO)$_{0.70}$ prepared by the same procedure as Example 2, and 0.48 g benzoyl peroxide together in toluene. The siloxane, upon pyrolysis, contained 0.197 g free carbon per gram of siloxane. The solvent was removed under vacuum at less than 50° C. The dried mixture was ground and collected through a 90 μm sieve. A sample of this mixture was fired to 2100° C. in argon at 20° C./min and held at 2100° C. for one hour. Throughout the firing cycle the sample was kept under pressure (4 ksi). The density of the resultant hot pressed body was 3.17 g/cm$^3$ (98.8% of theoretical). The hot pressed sample was sectioned and machined into test bars according to MIL-STD-1942 (MR) (Nov. 21, 1983). The average flex strength of the machined test bars was 90 ksi.

EXAMPLE 7

Preparation of Sintered Bodies with (PhSiO$_{1.5}$)$_{0.21}$(MeSiO$_{1.5}$)$_{0.43}$(PhViSiO)$_{0.36}$.

A—Polymer Synthesis. A solution of 50.8 g (0.25 moles) PhViSiCl$_2$, 31.7 g (0.15 moles) PhSiCl$_3$, and 44.8 g (0.30 moles) MeSiCl$_3$ in 50 mL toluene was added dropwise to a stirring mixture of 180 g Na$_2$CO$_3$ in 400 mL water and 250 mL toluene. After the addition was complete, the reaction mixture was stirred at room temperature for 45 minutes. The two phases were separated and the organic layer collected and concentrated under vacuum. The residue (75.2 g) was dissolved in about 150 g toluene and the solution refluxed over 0.103 g KOH by collecting the water using a Dean-Stark trap. After the water removal was complete, the toluene solution cooled to room temperature and about 1.0 mL Me$_3$SiCl added. After about one hour, the solution was filtered through a 0.2 μm membrane filter. The filtrate was concentrated under vacuum and the residue dissolved in 150 mL toluene. The toluene solution was poured into about 1.5 liters isopropanol. The precipitated polymer was collected and dried at about 200° C. and 1 torr. The yield was 41.9 g (54.8%). Proton NMR (CDCl$_3$, delta-values): −0.23 to 0.60 (SiMe, broad singlet), 5.6 to 6.4 (SiVi, broad singlet), and 6.9 to 8.0 (SiPh, broad singlet); the SiMe/SiVi/SiPh molar ratio was 2.7/1.0/1.1. GPC molecular weight (THF solvent): $M_w$=4993 and $M_n$=1215.

B—Calculations. A blend of 1.841 g of the above siloxane polymer and 0.035 g benzoyl peroxide was prepared in a mortar and pestle. The blend was heated to 135° C. for 45 minutes to crosslink the siloxane polymer. The cured siloxane was then fired to 1800° C. (room temperature to 1200° C. at 13° C./min, 1200° to 1800° C. at 5° C.min, and 30 minutes at 1800° C.) under argon. The sample had a mass retention of 50.0% and contained 49.0% carbon. The following calculations were made: 100 g of cured polymer gives 50.0 g of a ceramic char consisting of 51.0% (by difference) silicon and 49.0% carbon. The char consists of 36.4 g SiC (72.8%) and 13.6 g carbon (27.2%). Therefore, each gram of polymer, after pyrolysis, gives 0.364 g SiC and 0.136 g free carbon.

C—Test Bar Fabrication. A siloxane/SiC mixture with a free carbon value of 1.8% was prepared using the calculations of Part B above using the following procedure: 3.391 g of above siloxane polymer and 0.068 g benzoyl peroxide was mixed with 23.333 g Ibiden SiC powder and 0.075 g boron in a hardened alumina mortar and pestle until a thick paste was obtained. The paste was dried under vacuum to remove residual solvent. The dried powder was ground in a mortar and pestle and then passed through a 90 μm mesh sieve. The sieved powder was dry pressed into test bars (35×8×2 mm) at 46 ksi. The green test bars had an average flex strength of 1050±166 psi. The test bars were then cured at 75° C. for 1.5 hours; the average flex strength increased to 1720±107 psi. The test bars were then fired to 2050° C. under argon using the following temperature program: room temperature to 300° C. at 11.2° C./min, 300° to 550° C. at 10° C./min, 550° to 700° C. at 6° C./min, 700° to 1350° C. at 32.4° C./min, 1350° to 2050° C./min, and 2050° C. for 30 minutes. The average density of the fired test bars was 2.99 g/cm$^3$ (93.1% of theoretical). The fired test bars had an average flex strength of 34.4±4.2 ksi.

EXAMPLE 8

Preparation of Sintered Bodies with (PhSiO$_{1.5}$)$_{0.31}$(MeSiO$_{1.5}$)$_{0.46}$(PhViSiO)$_{0.23}$.

A—Polymer Synthesis. A solution of 30.5 g (0.15 moles) PhViSiCl$_2$, 42.3 g (0.20 moles) PhSiCl$_3$, and 44.8 g (0.30 moles) MeSiCl$_3$ in 50 mL toluene was added dropwise to a stirring mixture of 180 g Na$_2$CO$_3$ in 400 mL water and 250 mL toluene. After the addition was complete, the reaction mixture was stirred at room temperature for 45 minutes. The two phases were separated and the organic layer collected and concentrated under vacuum. The residue (71.3 g) was dissolved in 189.5 g toluene and the solution refluxed over 0.129 g KOH. The water was collected in a Dean-Stark trap. After all of the water was removed, the toluene solution was cooled to room temperature and about 1.0 mL Me$_3$SiCl was added. After about one hour, the solution was filtered through a 0.2 μm membrane filter. The filtrate was concentrated under vacuum and the residue dried at about 200° C. and 1 torr. The yield was 40.0 g (58.7%). GPC molecular weight (THF solvent): $M_w$=9011, $M_n$=1540.

B—Calculations. A blend of 1.740 g of the above siloxane polymer and 0.068 g benzoyl peroxide was prepared in a mortar and pestle. The blend was heated to 170° C. for 15 minutes to crosslink the polymer. The crosslinked polymer was fired to 1900° C. under an argon purge (room temperature to 1200° C. at 13° C./min, 1200° to 1900° C. at 5° C./min, and two hours at 1900° C.). The sample had a mass retention of 44.4% and contained 43.8% carbon. The following calculations were made: 100 g of cured polymer gives 44.4 g of a ceramic char consisting of 56.2% (by difference) silicon and 43.8% carbon. The char consists of 35.6 g SiC (80.3%) and 8.8 g carbon (19.7%). Therefore, each gram of polymer, after pyrolysis, gives 0.356 g SiC and 0.088 g free carbon.

C—Test Bar Fabrication. A siloxane/SiC blend with a free carbon value of 1.5% was prepared using the following procedure: 4.409 g of the above siloxane polymer and 0.176 g benzoyl peroxide dissolved in about 10-15 mL toluene was mixed with 23.042 g Ibiden SiC powder and 0.100 g boron in a hardened alumina mortar and pestle until a thick paste was obtained. The paste was dried under vacuum to remove residual solvent. The dried powder was ground in a mortar and pestle and then passed through a 90 μm mesh sieve. The sieved powder was dry pressed into test bars (35×8×2 mm) at 46 ksi. The green test bars had an average density of 2.21 g/cm$^3$ and a flex strength of 1376±224 ksi. The test bars were fired to 2050° C. in an argon atmosphere using the same temperature program as in Example 7 (Part C). The average density of the fired test bars was 3.11 g/cm$^3$ (96.9% of theoretical). The fired test bars had an average flex strength of 41.8±7.4 ksi.

EXAMPLE 9

Preparation of Sintered Bodies with (PhSiO$_{1.5}$)$_{0.75}$(Me$_2$ViSiO$_{0.5}$)$_{0.25}$ and Ph$_2$Si(OSiMe$_2$H)$_2$.

A—Polymer Synthesis. A mixture of 3960 g PhSi(OMe)$_3$ and 620 g (ViMe$_2$Si)$_2$O was added to a solution of 3 g trifluoromethane sulfonic acid in 800 g water. The reaction mixture was kept at room temperature for about 20 minutes and then refluxed for five hours. The reaction mixture was then cooled to room temperature and then neutralized with 2.73 g potassium carbonate. Volatiles were removed by distillation until the temperature of the reaction mixture reached 120° C. The reaction mixture was cooled to room temperature at which time 1500 g toluene and 125.7 g of a 3% aqueous KOH solution were added. Water was then removed using a Dean-Stark trap. After water removal was complete, the reaction mixture was cooled to room temperature at which time 20 mL Me$_2$ViSiCl was added. After stirring at room temperature for about two hours, the reaction mixture was filtered through a 0.2 μm membrane filter and the filtrate concentrated using a rotary evaporator. The residue was dried for about 1–2 hours at 100° C. and 1 torr. The yield of the resin of unit formula (PhSiO$_{1.5}$)$_{0.75}$(Me$_2$ViSiO$_{0.5}$)$_{0.25}$ was 3053.3 g (95.4% yield).

GPC molecular weight (THF solvent): $M_w=1803$, $M_n=806$.

B—Calculations. (1). A blend of 14.85 g of the above resin, 5.16 g $Ph_2Si(OSiMe_2H)_2$, and 0.01 g catalyst A was prepared. Catalyst A consisted of 0.09 g octadecyldimethylamine, 0.351 g $((C_4H_9)_3P)_2PtCl_2$, and 32.7 g toluene. A sample of this blend was crosslinked at 120° C. for one hour. This sample was fired to 1900° C. under argon using the same procedure as in Example 8. The sample had a mass retention of 44.9% and contained 53.4% carbon. The following calculations were made: 100 g of the cured polymer gives 44.9 g of a ceramic char consisting of 46.6% (by difference) silicon and 53.4% carbon. The char consists of 29.9 g SiC (66.6%) and 15.0 g carbon (33.4%). Therefore, each gram of polymer, after pyrolysis, gives 0.299 g SiC and 0.150 g free carbon.

(2). A blend of 16.21 g of the above resin, 3.80 g $Ph_2Si(OSiMe_2H)_2$, and 0.594 g catalyst A was prepared. A sample was crosslinked at 120° C. for one hour and then fired to 1900° C. under argon using the same procedure as Example 8. The sample had a mass retention of 47.4% and contained 48.8% carbon. The following calculations were made: 100 g of the cured polymer gives 47.4 g of a ceramic char consisting of 48.8% (by difference) silicon and 51.2% carbon. The char consists of 33.0 g SiC (69.7%) and 14.4 carbon (30.3%). Therefore, each gram of polymer, after pyrolysis, gives 0.330 g SiC and 0.144 g free carbon.

C—Test Bar Fabrication. (1). A blend of 29.7 g of the above resin, 10.32 g $Ph_2Si(OSiMe_2H)_2$, and 0.594 g catalyst A was prepared. The blend had a free carbon value of 1.5%. A sample of this blend (5.000 g) was dissolved in about 10-15 mL toluene and mixed with 47.6 g Ibiden SiC powder and 0.15 g boron in a hardened alumina mortar and pestle until a thick paste was obtained. The paste was dried under vacuum to remove residual solvent. The dried powder was ground in a mortar and pestle and then passed through a 90 μm mesh sieve. The sieved powder was dry pressed into test bars (35×8×2 mm) at 35 ksi. The green test bars had an average density of 2.04 g/cm³ and an average flex strength of 622±145 psi. The test bars were heated to 135° C. for 15 hours to crosslink the polymer. The cured test bars had an average density of 2.04 g/cm³ and an average flex strength of 1990±433 psi. The cured test bars were then fired to 2075° C. under argon at 15° C./min and then held at 2075° C. for 30 minutes. The fired test bars had an average density of 3.15 g/cm³ (98.1% of theoretical) and an average flex strength of 54.7±8.6 ksi.

(2). A sample (3.215 g) of the uncrosslinked blend prepared in Part C(1) above was mixed with 23.4 g Ibiden SiC powder and 0.106 g boron in toluene. The blend had a free carbon value of 1.9%. Test bars were prepared using the same procedure as in Part C(1) above and had a density of 2.15 g/cm³ in the green state. The green test bars were heated to 135° C. for 3 days to crosslink the polymer. Afterwards, the test bars had an average flex strength of 3065±339 psi. The cured test bars were fired to 2075° C. using the following temperature program: room temperature to 520° C. at 17.3° C./min, 520° to 800° C. at 9.3° C./min, 800° to 1100° C. at 11.1° C./min, 1100° to 1300° C. at 1.7° C./min, 1300° to 2075° C. at 25.8° C./min, and 2075° C. for 30 minutes. The average density of the fired test bars was 3.15 g/cm³ (98.1% of theoretical). The fired test bars had an average flex strength of 48.7±6.2 ksi.

(3). A blend of 29.7 g of the above $(PhSiO_{1.5})_{0.75}(Me_2ViSiO_{0.5})_{0.25}$ resin, 10.32 g $Ph_2Si(OSiMe_2H)_2$, and 0.594 g catalyst B was prepared. Catalyst B consisted of 0.182 g $HOCH_2CH_2NH_2$, 1.00 g $((C_4H_9)_3P)_2PtCl_2$, and 100 g toluene. A solution of this uncrosslinked blend (5.25 g) and 2.0 g of a dispersing agent (OLOA 1200 from Chevron Chemical) in hexane was mixed with 50 g Superior Graphite SiC powder and 0.5 g boron in a hardened alumina mortar and pestle until a thick paste was obtained. The blend had a free carbon value of 1.4%. The residual solvent was removed under vacuum. The dried powder was ground and passed through a 90 μm screen. The sieved powder was uniaxial pressed at 50 ksi into test bars (7.7×35.9×15 mm). The density of the green test bars was 2.27±0.02 g/cm³. The test bars were fired to 2075° C. under argon using the following temperature profile: room temperature to 1400° C. at 25° C./min, 1400° C. for 30 minutes, 1400° to 2075° C. at 15° C./min, and 2075° C. for 30 minutes. The density of the fired samples averaged 3.14±0.02 g/cm³ (97.8% of theoretical). After machining (according to MIL-STD-1942 (MR) (Nov. 21, 1983)) the flex strength averaged 48.3±7.5 ksi.

(4). A solution of 4.14 g of the above resin of unit formula $(PhSiO_{1.5})_{0.75}(Me_2ViSiO_{0.5})_{0.25}$, 1.11 g $Ph_2Si(OSiMe_2H)_2$ and 5 drops of catalyst C in 150 mL hexane was ultrasonically mixed with 50 g Starck A10 SiC powder and 0.25 g boron for 10 minutes to give a 1.5% free carbon value blend. Catalyst C consisted of 0.11 g $HOCH_2CH_2NH_2$, 0.10 g $((C_4H_9)_3P)_2PtCl_2$, and 10 g toluene. The solvent was removed under vacuum and the residue passed through a 60 mesh screen. The sieved powder was uniaxially pressed into test bars at various pressures. Test bars were fired to 2020° C. and 2075° C. using the same temperature program as described in Part C(4) above. The following results were obtained:

| pressure (ksi) | green density (g/cm³) | 2020° C. fired density (g/cm³) | 2075° C. fired density (g/cm³) |
| --- | --- | --- | --- |
| 10 | 1.92 | — | 2.99 |
| 20 | 1.93 | 2.97 | 3.02 |
| 30 | 1.96 | 2.97 | 3.02 |
| 50 | 1.99 | 2.99 | 3.05 |
| 60 | 2.05 | 3.00 | 3.07 |

(5). A solution of 4.14 g of the above resin of unit formula $(PhSiO_{1.5})_{0.75}(Me_2ViSiO_{0.5})_{0.25}$, 1.11 g $Ph_2Si(OSiMe_2H)_2$ and 5 drops of catalyst C in 150 mL hexane was ultrasonically mixed with 50 g Starck B10 SiC powder and 0.25 g boron for 10 minutes to give a 1.5% free carbon value blend. Catalyst C is described in Part C(4) above. The solvent was removed under vacuum and the residue passed through a 60 mesh screen. The sieved powder was uniaxially pressed into test bars at various pressures. Test bars were fired to 2020° C. and 2075° C. using the same temperature program as used in Part C(4) above. The following results were obtained:

| pressure (ksi) | green density (g/cm³) | 2020° C. fired density (g/cm³) | 2075° C. fired density (g/cm³) |
| --- | --- | --- | --- |
| 10 | 2.06 | — | 3.11 |
| 20 | 2.08 | 3.04 | 3.11 |
| 30 | 2.13 | 3.06 | 3.11 |
| 50 | 2.15 | 3.03 | 3.11 |

-continued

| pressure (ksi) | green density (g/cm$^3$) | 2020° C. fired density (g/cm$^3$) | 2075° C. fired density (g/cm$^3$) |
| --- | --- | --- | --- |
| 60 | 2.18 | 3.08 | 3.10 |

(6). Test bars were prepared using the same blend and procedures as in C(5) above except that Ibiden SiC powder was used; the pressure for preparing the test bars was varied. The test bars were cured in an argon atmosphere at 150° C. for 17 hours. The following results were obtained:

| pressure (ksi) | green strength (psi) | cured strength (psi) |
| --- | --- | --- |
| 10 | 140 | 1117 |
| 20 | 260 | 1873 |
| 35 | 250 | 1858 |
| 50 | 323 | 2345 |

(7). A solution of 4.57 g of the above resin of unit formula (PhSiO$_{1.5}$)$_{0.75}$(Me$_2$ViSiO$_{0.5}$)$_{0.25}$, 1.59 g Ph$_2$Si(OSiMe$_2$H)$_2$ and 0.111 g catalyst B in 450 mL hexane was ultrasonically mixed with 44.75 g Ibiden SiC powder and 0.503 g aluminum oxide for 10 minutes. The resulting blend had a free carbon value of 1.9%. Catalyst B is described in Part C(3) above. The solvent was removed under vacuum and the residue passed through a 250 μm screen. The sieved powder was uniaxially pressed into test bars at 47 ksi. The test bars were cured in air at 200° C. for 18 hours. The cured test bars had an average density of 2.19±0.01 g/cm$^3$ and a flex strength of 2601±224 psi. The test bars were then fired to 2075° C. at 15° C./min (with 30 minutes at 1400° C. and 2075° C.) under an argon atmosphere. The average density of the fired test bars was 2.76 g/cm$^3$ (86% theoretical).

(8). Test bars were prepared from 3.53 g of the above resin, 1.22 g Ph$_2$Si(OSiMe$_2$H)$_2$, 0.105 g catalyst B, 44.75 g Ibiden SiC powder, and 0.50 g boron carbide powder using the same procedure as in C(7) above; the test bars were cured and fired to 2075° C. as in C(7) above. The cured (unfired) test bars had an average density of 2.13±0.01 g/cm$^3$ and a flex strength of 2417±256 psi. The average density of the fired test bars was 3.14 g/cm$^3$ (98% theoretical).

(9). Test bars were prepared from 3.53 g of the above resin, 1.22 g Ph$_2$Si(OSiMe$_2$H)$_2$, 0.105 g catalyst B, 44.75 g Ibiden SiC powder, and 0.503 g aluminum nitride using the same procedure as in C(7) above; the test bars were cured and fired to 2075° C. as in C(7) above. The cured (unfired) test bars had an average density of 2.23±0.02 g/cm$^3$ and a flex strength of 4224±110 psi. The average density of the fired test bars was 2.70 g/cm$^3$ (84% theoretical).

(10). Test bars were prepared from 3.53 g of the above resin, 1.22 g Ph$_2$Si(OSiMe$_2$H)$_2$, 0.105 g catalyst B, 44.75 g Ibiden SiC powder, 0.255 g aluminum oxide, and 0.256 g boron using the same procedure as in C(7) above; the test bars were cured and fired to 2075° C. as in C(7) above. The cured (unfired) test bars had an average density of 2.11±0.02 g/cm$^3$ and a flex strength of 2300±168 psi. The average density of the fired test bars was 2.76 g/cm$^3$ (86% theoretical).

EXAMPLE 10

Preparation of Sintered Bodies with (PhSiO$_{1.5}$)$_{0.50}$(C$_3$H$_7$SiO$_{1.5}$)$_{0.15}$(Me$_2$ViSiO)$_{0.35}$ and PhSi(OSiMe$_2$H)$_3$.

A—Polymer Synthesis. A mixture of 152.5 g PhSi(OMe)$_3$, 37.9 g C$_3$H$_7$Si(OMe)$_3$, and 50.1 g (ViMe$_2$Si)$_2$O was added to a solution of 0.16 g trifluoromethane sulfonic acid in 54 g water. The reaction mixture was kept at room temperature for approximately 20 minutes and then refluxed for four hours. The reaction mixture was cooled and then neutralized with 0.18 g potassium carbonate. The volatiles were removed by distillation until the reaction mixture reached 120° C. The reaction mixture was cooled and 70 g toluene and 6.2 g aqueous 3% KOH was added. The water was removed using a Dean-Stark trap. After the water removal was complete, the reaction mixture was cooled and 1 mL Me$_2$ViSiCl was added. After stirring at room temperature for about two hours the reaction mixture was filtered through a sintered glass filter and the filtrate concentrated using rotary evaporation. The residue was dried at 100° C. and 1 torr. The yield was 155.2 g. Proton NMR (d8-toluene, delta-values): 0.04 to 0.6 (SiMe, broad singlet), 0.7 to 2.1 (SiC$_3$H$_7$, broad hump), 5.7 to 6.3 (SiVi, broad multiplet), and 6.8 to 8.4 (SiPh, broad multiplet); the molar ratio of SiMe/SiC$_3$H$_7$/SiVi/SiPh was 2.1/1.4/1.0/3.3. GPC molecular weight (THF solvent): $M_w$=1248, $M_n$=867.

B—Calculations. A blend of 5.00 g of the above resin, 1.73 g PhSi(OSiMe$_2$H)$_3$, and 0.069 g catalyst B was prepared. Catalyst B consisted of 0.182 g HOCH$_2$CH$_2$NH$_2$, 1.00 g ((C$_4$H$_9$)$_3$P)$_2$PtCl$_2$, and 100 g toluene. A sample of this blend was crosslinked at 200° C. for two hours. The crosslinked polymer was fired to 1900° C. under argon at a rate of about 15° C./min and held at 1900° C. for two hours. The sample had a mass retention of 27.6% and contained 40.8% carbon. The following calculations were made: 100 g of cured polymer gives 27.6 g of a ceramic char consisting of 59.2% (by difference) silicon and 40.8% carbon. The char consists of 23.3 g SiC (84.6%) and 4.3 g carbon (15.4%). Therefore, each gram of polymer, after pyrolysis, gives 0.233 g SiC and 0.043 g free carbon.

C—Test Bar Fabrication. A blend containing 25.00 g of the above resin, 8.65 g PhSi(OSiMe$_2$H)$_3$, and 0.345 g catalyst B was prepared. This blend (25.02 g) was mixed with 74.7 g Ibiden SiC powder and 0.3 g amorphous boron in a Brabender mixing chamber until a thick paste was obtained. The blend had a free carbon value of 1.3%. Several 10 g samples were transfer molded at 110° C. into a spiral flow mold using a 1000 psi ram pressure, a 1800 psi clamping pressure, and a five minute transfer cycle. A spiral flow of 8.5 inches was obtained. Two 36 g samples were transfer molded into a 12-cavity test bar mold (each cavity was 6.2×37.8×2.5 mm) using the same molding conditions. The molded test bars were cured at 205° C. for two hours. The cured test bars had an average flex strength of 5187±758 psi. The test bars were fired to 2075° C. at 1° to 2° C./min with 30 minutes at 2075° C. The average density of the fired test bars was 3.09 g/cm$^3$ (96.3% of theoretical). The fired test bars had an average flex strength of 25.9±16.8 ksi.

EXAMPLE 11

Preparation of Sintered Bodies with
$(PhSiO_{1.5})_{0.27}(MeSiO_{1.5})_{0.18}(Me_2SiO)_{0.18}(MeViSiO)_{0.25}(Ph_2SiO)_{0.12}$ A—Polymer Synthesis. To a three-necked, five liter flask equipped with a drainage stopcock, thermometer, condenser, overhead mechanical stirrer, and addition funnel was added 1790 g water and 324 g isopropyl alcohol. A mixture of 134.6 g (0.90 moles) $MeSiCl_3$, 116.1 g (0.90 moles) $Me_2SiCl_2$, 285.5 g (1.35 moles) $PhSiCl_3$, 151.8 g (0.60 moles) $Ph_2SiCl_2$, and 176 g (1.25 moles) $MeViSiCl_2$ dissolved in 792 g toluene was added below the water surface over a fifteen minute period. During the addition, the reaction temperature increased to 45° C. The reaction mixture was stirred for five minutes. The collected organic layer was washed twice with warm tap water and then azeotropically dried and then bodied with zinc octoate (0.1% based on the total weight of the polymer). The solvent was removed and the resin dried at 150° C. and 20 torr. The product yield was 535 g (91.2%).

B—Calculations. A sample of the above polymer mixed with 1% dicumyl peroxide was cured at 200° C. for one hour. The cured polymer was fired to 1900° C. under argon at a rate of 15° C./min and held at 1900° C. for two hours. The sample had a mass retention of 43.7% and contained 40.6% carbon. The following calculations were made: 100 g of cured polymer gives 43.7 g of a ceramic char consisting of 59.4% (by difference) silicon and 40.6% carbon. The char consists of 37.1 g SiC (84.9%) and 6.6 g carbon (15.1%). Therefore, each gram of polymer, after pyrolysis, gives 0.371 g SiC and 0.066 g free carbon.

C—Test Bar Fabrication. Ibiden SiC (76.1 g), 0.34 g boron, 0.51 g zinc stearate, and 27.02 g of the above resin was mixed at 110° C. in a Brabender mixing chamber until a homogeneous mix was obtained. The mixture had a 2.0% free carbon value. The mixture was transfer molded into a 12-cavity test bar mold (each cavity was 6.2×37.8×2.5 mm) at 177° C. at a ram pressure of 1000 psi and a clamping pressure of 1850 psi. The test bars were removed from the mold and further cured at 205° C. for 1.5 hours. The cured test bars had an average flex strength of 2045±645 psi. The test bars were fired to 2075° C. using a temperature program of room temperature to 180° C. at 3° C./min, 180° to 700° C. at 0.5° C./min, 700° to 1400° C. at 1.5° C./min, 1400° C. for 30 minutes, 1400° to 2075° C. at 20° C./min, and 2075° C. for 30 minutes. The furnace was cooled from 2075° C. to 600° C. at 10° C./min. The fired test bars had an average flex strength of 41.9±5.8 ksi and an average density of 3.07 g/cm³ (95.6% of theoretical).

EXAMPLE 12

Preparation of Sintered Bodies with
$(PhMeSiO)_{0.33}(MeHSiO)_{0.61}(Me_3SiO_{0.5})_{0.06}$ and
$(PhSiO_{1.5})_{0.34}(ViSiO_{1.5})_{0.33}(Me_2ViSiO_{0.5})_{0.33}$.

A—Polymer Synthesis. Polymer 1: $(PhMeSiO)_{0.33}(MeHSiO)_{0.61}(Me_3SiO_{0.5})_{0.06}$. A mixture of 77.0 g $PhSi(OMe)_3$, 63.4 g of a siloxane fluid obtained from the hydrolysis of $MeHSiCl_2$, 8.02 g hexamethyldisiloxane, and 0.2 g trifluoromethane sulfonic acid were dissolved in 170 g toluene. The reaction mixture was refluxed four hours while the byproduct water was removed by azeotropic distillation. After cooling to room temperature, the reaction mixture was neutralized with $K_2CO_3$ and the solution filtered through a sintered glass frit. Removal of the solvent gave 129.8 g (87.0% yield) of a low viscosity fluid.

Polymer 2: $(PhSiO_{1.5})_{0.33}(ViSiO_{1.5})_{0.33}(Me_2ViSiO_{0.5})_{0.33}$. A mixture of 495.1 g (2.5 moles) $PhSi(OMe)_3$, 370 g (0.25 moles) $ViSi(OMe)_3$, 232.5 g (1.25 moles) $(Me_2ViSi)_2O$, 270 g distilled water and 0.7 g trifluoromethane sulfonic acid was refluxed for four hours. The reaction mixture was cooled to room temperature and neutralized with 0.72 g $K_2CO_3$. The volatiles were removed by distillation until the temperature of the reaction mixture reached 120° C. After cooling to room temperature, 34.0 g of 3% aqueous KOH and 400 g toluene was added. The water was then removed by azeotropic distillation. The reaction was then quenched with 10 mL $Me_2ViSiCl$. After filtration and removal of the solvent, 650 g (86.4% yield) of a clear residue was obtained. Proton NMR ($CDCl_3$, delta-values): −0.2 to 0.3 (SiMe, overlapping singlets), 5.4 to 6.1 (SiVi, broad multiplet), and 6.8 to 7.9 (SiPh, broad multiplet); SiMe/SiVi/SiPh molar ratio was 1.0/2.1/1.2. GPC molecular weight (THF solvent): $M_w = 863$, $M_n = 1641$.

B—Calculations. A blend of 4.06 g of Polymer 1, 5.00 g of Polymer 2, and 0.13 g catalyst B (as described in Example 10) was prepared. The polymer mixture was crosslinked at 200° C. for 4 to 5 hours and then fired to 1900° C. in argon using a temperature program of room temperature to 1000° C. at 11° C./min, 1000° to 1900° C. at 4.4° C./min, and two hours at 1900° C. The sample had a mass retention of 50.8% and contained 38.8% carbon. The following calculations were made: 100 g of cured polymer gives 50.8 g of a ceramic char consisting of 61.2% (by difference) silicon and 38.8% carbon. The char consists of 44.4 g SiC (87.4%) and 6.4 g carbon (12.6%). Therefore, each gram of polymer, after pyrolysis, gives 0.444 g SiC and 0.064 g free carbon.

C—Test Bar Fabrication. A blend of 11.96 g of Polymer 1, 14.73 g of Polymer 2, 0.51 g catalyst B, 79.8 g Ibiden SiC, and 0.32 g boron was compounded in a Brabender mixing chamber until a homogeneous paste was obtained. The blend had a free carbon value of 1.8%. A 10 g sample of this blend was transfer molded in a spiral flow mold at 150° C.; at a ram pressure of 1000 psi and a clamping pressure of 1850 psi, 13.5 inches of flow was obtained. Test bars (6.2×37.8×6.2 mm) were prepared using the same molding conditions and a 12-cavity test bar mold. The test bars were further cured at 200° C. for 16 hours. The cured test bars had an average flex strength of 3900±1150 psi. The test bars were fired to 2049° C. in argon using the following temperature profile: room temperature to 490° C. at 4.9° C./min, 490° to 1050° C. at 4.7° C./min, 1050° to 2049° C. at 4.3° C./min, and 30 minutes at 2049° C. The average density of the fourteen fired test bars was 3.10 g/cm³ (96.6% of theoretical).

That which is claimed is:

1. A method of preparing a sintered body of silicon carbide, said method comprising
   (a) forming a handleable green body by
      (i) blending components consisting essentially of silicon carbide powder, a metal-containing sintering aid, an organopolysiloxane curing agent, and a preceramic organopolysiloxane to a uniform mixture, where the metal containing sintering aid is present at 0.1 to 3.0 weight percent of the metal based on the weight of silicon carbide powder, where the organopolysiloxane curing agent is present in an effective amount to cure, and where the preceramic organopolysiloxane is present at such a level that the free carbon value of the mixture is greater than 0.2 weight percent based on the total weight of the silicon carbide powder and the stable ceramic char derived from the preceramic organopolysiloxane, and (ii) then forming the uniform mixture into the desired shape under pressure at a temperature less than about 500° C. to obtain a handleable green body; and (b) sintering the handleable green body in an inert atmosphere at a temperature greater than 1900° C. to obtain a sintered body of silicon carbide with a density greater than 2.4 g/cm$^3$.

2. A method as described in claim 1 wherein the free carbon value of the preceramic organopolysiloxane is determined, prior to forming a handleable green body, by heating a known amount of the preceramic organopolysiloxane containing an effective amount of an organopolysiloxane curing agent under an inert atmosphere to an elevated temperature for a time sufficient to convert the preceramic organopolysiloxane into a stable ceramic char material, determining the stable ceramic char yield and the silicon and carbon content of the stable ceramic char material, and then calculating the amount of free carbon in the stable ceramic char material per part of the preceramic organopolysiloxane and wherein the metal-containing sintering aid is selected from the group consisting of boron, boron containing compounds, aluminum, and aluminum-containing compounds.

3. A method as described in claim 1 wherein the preceramic organopolysiloxane is present at such a level that the free carbon value of the mixture is greater than 0.5 weight percent, wherein the sintered body of silicon carbide has a density greater than 2.7 g/cm$^3$, and wherein the metal-containing sintering aid is selected from the group consisting of boron, boron-containing compounds, aluminum, and aluminum-containing compounds.

4. A method as described in claim 2 wherein the preceramic organopolysiloxane is present at such a level that the free carbon value of the mixture is greater than 0.5 weight percent and wherein the sintered body of silicon carbide has a density greater than 2.7 g/cm$^3$.

5. A method as described in claim 4 wherein the preceramic organopolysiloxane contains [RSiO$_{1.5}$] and [R$_2$SiO] units where each R is independently selected from the group consisting of hydrogen, alkyl radicals containing 1 to 20 carbon atoms, phenyl radicals, and vinyl radicals and wherein sintering is carried out without pressure.

6. A method as described in claim 5 wherein the preceramic organopolysiloxane is present at such a level that the free carbon value of the mixture is between 0.5 and 3.0 weight percent.

7. A method as described in claim 6 wherein the preceramic organopolysiloxane is present at such a level that the free carbon value of the mixture is between 1.0 and 2.0 weight percent.

8. A method as described in claim 5 wherein the preceramic organopolysiloxane is described by the unit formula [PhSiO$_{1.5}$][MeSiO$_{1.5}$][PhViSiO] where there are 10 to 90 mole percent [PhSiO$_{1.5}$] units, 0 to 50 mole percent [MeSiO$_{1.5}$] units, and 10 to 90 mole percent [PhViSiO] units.

9. A method as described in claim 8 wherein there are 20 to 30 mole percent [PhSiO$_{1.5}$] units, 30 to 50 mole percent [MeSiO$_{1.5}$] units, and 30 to 50 mole percent [PhViSiO] units.

10. A method as described in claim 9 wherein the metal-containing sintering aid is boron or boron carbide.

11. A method as described in claim 4 wherein the handleable green body is sintered at a temperature of 2000° to 2200° C. to obtain a sintered body of silicon carbide with a density greater than 2.9 g/cm$^3$.

12. A method as described in claim 9 wherein the handleable green body is sintered at a temperature of 2000° to 2200° C. to obtain a sintered body of silicon carbide with a density greater than 2.9 g/cm$^3$.

13. A method as described in claim 3 wherein the handleable green body is cured prior to the sintering step.

14. A method as described in claim 4 wherein the handleable green body is cured prior to the sintering step.

15. A method as described in claim 9 wherein the handleable green body is cured prior to the sintering step.

16. A method as described in claim 14 wherein the organopolysiloxane curing agent is an organic peroxide which is present at 0.1 to 5.0 weight percent based on the weight of the organopolysiloxane.

17. A method as described in claim 15 wherein the organopolysiloxane curing agent is an organic peroxide which is present at 0.1 to 5.0 weight percent based on the weight of the organopolysiloxane.

18. A method as described in claim 14 wherein the organopolysiloxane contains both vinyl radicals and hydrogen atoms attached to silicon and wherein the organopolysiloxane curing agent is a platinum-containing catalyst which is present at 1.0 to 1000 ppm based on the weight of the organopolysiloxane.

19. A method as described in claim 15 wherein the organopolysiloxane contains both vinyl radicals and hydrogen atoms attached to silicon and wherein the organopolysiloxane curing agent is a platinum-containing catalyst which is present at 1.0 to 1000 ppm based on the weight of the organopolysiloxane.

20. A method of forming a handleable green body, which method comprises (a) blending components consisting essentially of silicon carbide powder, a metal-containing sintering aid, an organopolysiloxane curing agent, and a preceramic organopolysiloxane to a uniform mixture, where the metal containing sintering aid is present at 0.1 to 3.0 weight percent of the metal based on the weight of silicon carbide powder, where the organopolysiloxane curing agent is present in an effective amount to cure, and where the preceramic organopolysiloxane is present at such a level that the free carbon value of the mixture is greater than 0.2 weight percent based on the total weight of the silicon carbide powder and the stable ceramic char derived from the preceramic organopolysiloxane; and (b) forming the uniform mixture into the desired shape under pressure at a temperature less than about 500° C.

21. A method as described in claim 20 wherein the free carbon value of the preceramic organopolysiloxane is determined, prior to preparing the uniform mixture, by heating a known amount of the preceramic organopolysiloxane under an inert atmosphere to an elevated temperature for a time sufficient to convert the preceramic organopolysiloxane into a stable ceramic char material, determining the stable ceramic char yield and the silicon and carbon content of the stable ceramic char material, and then calculating the amount of free carbon in the stable ceramic char material per part of the preceramic organopolysiloxane and wherein the metal-containing sintering aid is selected from the group consisting of boron, boron containing compounds, aluminum, and aluminum-containing compounds.

22. A method as described in claim 20 wherein the preceramic organopolysiloxane is present at such a level that the free carbon value of the mixture is greater than 0.5 weight percent and wherein the metal-containing sintering aid is selected from the group consisting of boron, boron-containing compounds, aluminum, and aluminum-containing compounds.

23. A method as described in claim 21 wherein the preceramic organopolysiloxane is present at such a level that the free carbon value of the mixture is greater than 0.5 weight percent.

24. A method as described in claim 23 wherein the preceramic organopolysiloxane contains [RSiO$_{1.5}$] and [R$_2$SiO] units where each R is independently selected from the group consisting of hydrogen, alkyl radicals containing 1 to 20 carbon atoms, phenyl radicals, and vinyl radicals.

25. A method as described in claim 24 wherein the preceramic organopolysiloxane is present at such a level that the free carbon value of the mixture is between 0.5 and 3.0 weight percent.

26. A method as described in claim 25 wherein the preceramic organopolysiloxane is present at such a level that the free carbon value of the mixture is between 1.0 and 2.0 weight percent.

27. A method as described in claim 26 wherein the preceramic organopolysiloxane is present at such a level that the free carbon value of the mixture is about 1.5 weight percent.

28. A method as described in claim 24 wherein the preceramic organopolysiloxane is described by the unit formula [PhSiO$_{1.5}$][MeSiO$_{1.5}$][PhViSiO] where there are 10 to 90 mole percent [PhSiO$_{1.5}$] units, 0 to 50 mole percent [MeSiO$_{1.5}$] units, and 10 to 90 mole percent [PhViSiO] units.

29. A method as described in claim 28 wherein there are 20 to 30 mole percent [PhSiO$_{1.5}$] units, 30 to 50 mole percent [MeSiO$_{1.5}$] units, and 30 to 50 mole percent [PhViSiO] units.

30. A method as described in claim 28 wherein the metal-containing sintering aid is boron or boron carbide.

31. A method as described in claim 20 wherein the handleable green body formed thereby is subsequently cured prior to sintering.

32. A method as described in claim 21 wherein the handleable green body formed thereby is subsequently cured prior to sintering.

33. A method as described in claim 29 wherein the handleable green body formed thereby is subsequently cured prior to sintering.

34. A method as described in claim 32 wherein the organopolysiloxane curing agent is an organic peroxide which is present at 0.1 to 5.0 weight percent based on the weight of the organopolysiloxane.

35. A method as described in claim 33 wherein the organopolysiloxane curing agent is an organic peroxide which is present at 0.1 to 5.0 weight percent based on the weight of the organopolysiloxane.

36. A method as described in claim 32 wherein the organopolysiloxane contains both vinyl radicals and hydrogen atoms attached to silicon and wherein the organopolysiloxane curing agent is a platinum-containing catalyst which is present at 1.0 to 1000 ppm based on the weight of the organopolysiloxane.

37. A method as described in claim 33 wherein the organopolysiloxane contains both vinyl radicals and hydrogen atoms attached to silicon and wherein the organopolysiloxane curing agent is a platinum-containing catalyst which is present at 1.0 to 1000 ppm based on the weight of the organopolysiloxane.

38. A uniform mixture consisting essentially of silicon carbide powder, a metal-containing sintering aid, a preceramic organopolysiloxane, and an organopolysiloxane curing agent, where the metal-containing sintering aid is present at 0.1 to 3.0 weight percent of the metal based on the weight of silicon carbide powder, where the organopolysiloxane curing agent is present in an effective amount to cure, and where the preceramic organopolysiloxane is present at such a level that the free carbon value of the mixture is greater than 0.2 weight percent based on the total weight of the silicon carbide powder and the stable ceramic char derived from the preceramic organopolysiloxane.

39. A uniform mixture as described in claim 38 wherein the preceramic organopolysiloxane is present at such a level that the free carbon value of the mixture is greater than 0.5 weight percent and wherein the metal-containing sintering aid is selected from the group consisting of boron, boron-containing compounds, aluminum, and aluminum-containing compounds.

40. A uniform mixture as described in claim 39 wherein the preceramic organopolysiloxane contains [RSiO$_{1.5}$] and [R$_2$SiO] units where each R is independently selected from the group consisting of hydrogen, alkyl radicals containing 1 to 20 carbon atoms, phenyl radicals, and vinyl radicals.

41. A uniform mixture as described in claim 40 wherein the preceramic organopolysiloxane is present at such a level that the free carbon value of the mixture is between 0.5 and 3.0 weight percent.

42. A uniform mixture as described in claim 41 wherein the preceramic organopolysiloxane is present at such a level that the free carbon value of the mixture is between 1.0 and 2.0 weight percent.

43. A uniform mixture as described in claim 42 wherein the preceramic organopolysiloxane is present at such a level that the free carbon value of the mixture is about 1.5 weight percent.

44. A uniform mixture as described in claim 41 wherein the preceramic organopolysiloxane is described by the unit formula [PhSiO$_{1.5}$][MeSiO$_{1.5}$][PhViSiO] where there are 10 to 90 mole percent [PhSiO$_{1.5}$] units, 0 to 50 mole percent [MeSiO$_{1.5}$] units, and 10 to 90 mole percent [PhViSiO] units.

45. A uniform mixture as described in claim 44 wherein there are 20 to 30 mole percent [PhSiO$_{1.5}$] units, 30 to 50 mole percent [MeSiO$_{1.5}$] units, and 30 to 50 mole percent [PhViSiO] units.

46. A uniform mixture as described in claim 41 wherein the metal-containing sintering aid is boron or boron carbide.

47. A uniform mixture as described in claim 39 wherein the organopolysiloxane curing agent is an organic peroxide which is present at 0.1 to 5.0 weight percent based on the weight of the organopolysiloxane.

48. A uniform mixture as described in claim 45 wherein the organopolysiloxane curing agent is an organic peroxide which is present at 0.1 to 5.0 weight percent based on the weight of the organopolysiloxane.

49. A uniform mixture as described in claim 39 wherein the organopolysiloxane contains both vinyl radicals and hydrogen atoms attached to silicon and wherein the organopolysiloxane curing agent is a platinum-containing catalyst which is present at 1.0 to 1000 ppm based on the weight of the organopolysiloxane.

50. A uniform mixture as described in claim 45 wherein the organopolysiloxane contains both vinyl radicals and hydrogen atoms attached to silicon and wherein the organopolysiloxane curing agent is a platinum-containing catalyst which is present at 1.0 to 1000 ppm based on the weight of the organopolysiloxane.

* * * * *